US011259556B2

(12) United States Patent
Borrell

(10) Patent No.: US 11,259,556 B2
(45) Date of Patent: Mar. 1, 2022

(54) MACHINE FOR THE INTEGRAL PROCESSING OF HARD-OR-SOFT-SHELLED NUTS

(71) Applicant: Jose Borrell S.A., Denia (ES)

(72) Inventor: Jose Vicente Roig Borrell, Denia (ES)

(73) Assignee: Jose Borrell S.A.

( * ) Notice: Subject to any disclaimer, the term of this patent is extended or adjusted under 35 U.S.C. 154(b) by 0 days.

(21) Appl. No.: 16/692,171

(22) Filed: Nov. 22, 2019

(65) Prior Publication Data

US 2020/0163371 A1 May 28, 2020

(30) Foreign Application Priority Data

Nov. 22, 2018 (ES) .............................. ES201831814U

(51) Int. Cl.
*A23N 5/00* (2006.01)
(52) U.S. Cl.
CPC ..................... *A23N 5/008* (2013.01)
(58) Field of Classification Search
CPC .................................................. A23N 5/00–08
See application file for complete search history.

(56) References Cited

U.S. PATENT DOCUMENTS

| | | | | |
|---|---|---|---|---|
| 1,576,244 A * | 3/1926 | Nehrhood | ............... | A23N 5/008 209/32 |
| 2,484,318 A * | 10/1949 | Smith | ..................... | A23N 5/002 209/394 |
| 2,500,675 A * | 3/1950 | Goodwin | ............... | A23N 5/008 99/575 |
| 2009/0301320 A1* | 12/2009 | Borrell | ................... | A23N 5/008 99/569 |

FOREIGN PATENT DOCUMENTS

| | | |
|---|---|---|
| ES | 1062979 U | 8/2006 |
| ES | 1068167 U | 9/2008 |
| ES | 1077665 U | 9/2012 |

* cited by examiner

*Primary Examiner* — Erin E McGrath
(74) *Attorney, Agent, or Firm* — St. Onge Steward Johnston & Reens LLC

(57) ABSTRACT

A machine for the integral processing of hard or soft shelled nuts herein proposed comprises a feeding hopper and at least one receptacle having a first end for connection to said hopper and a second opposite end, where said receptacle is located in a horizontal position according to the longitudinal direction of the machine and comprises therein a central shaft located according to the longitudinal direction thereof and connected at one end to a rotating element, where said central shaft has finger-like elements projecting radially outwards from various longitudinal positions thereof.

13 Claims, 11 Drawing Sheets

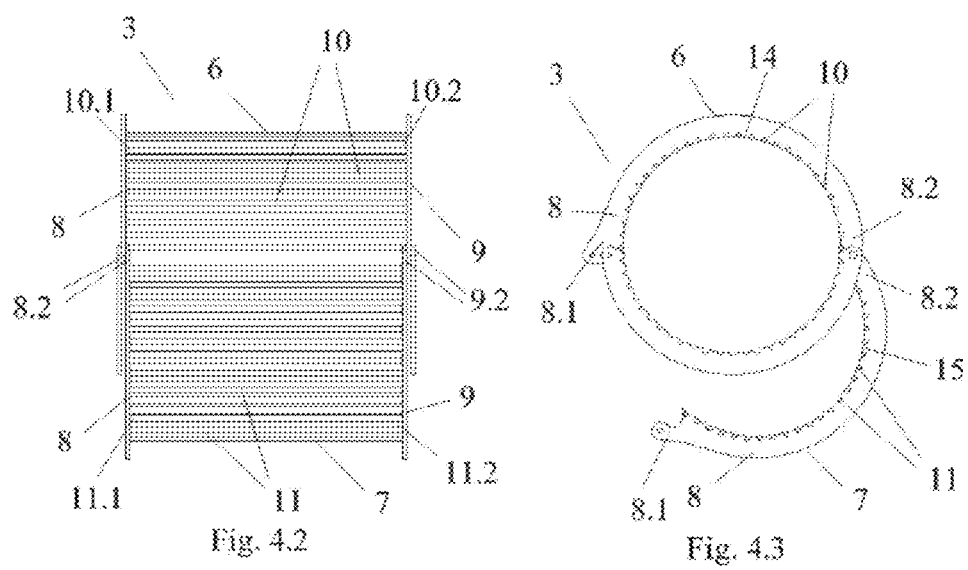
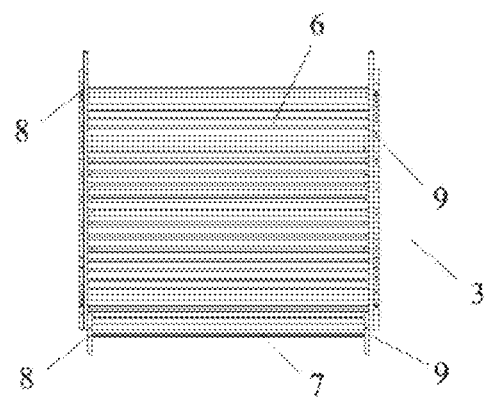

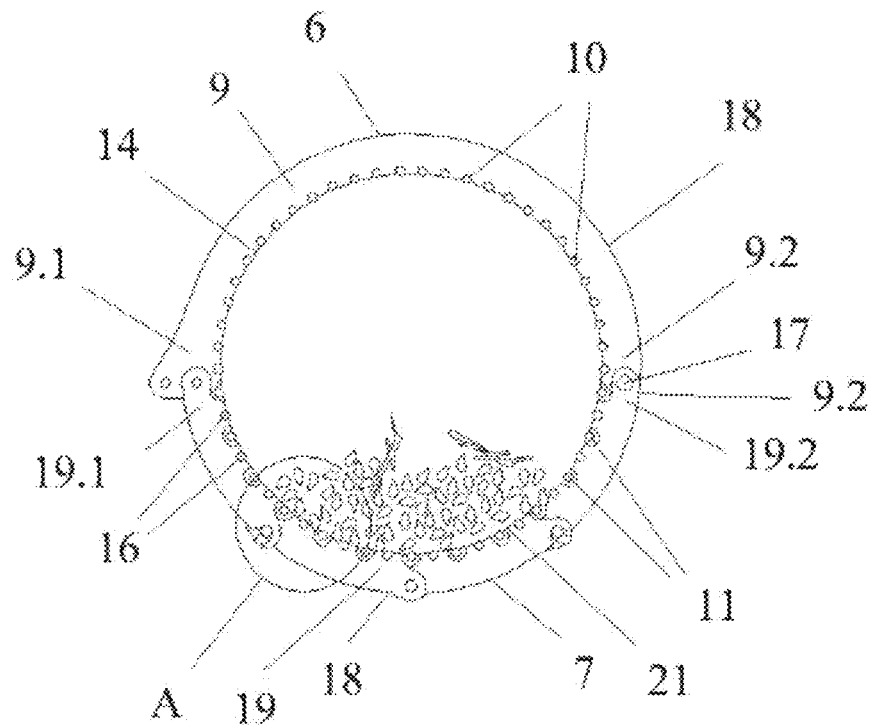
Fig. 9.1
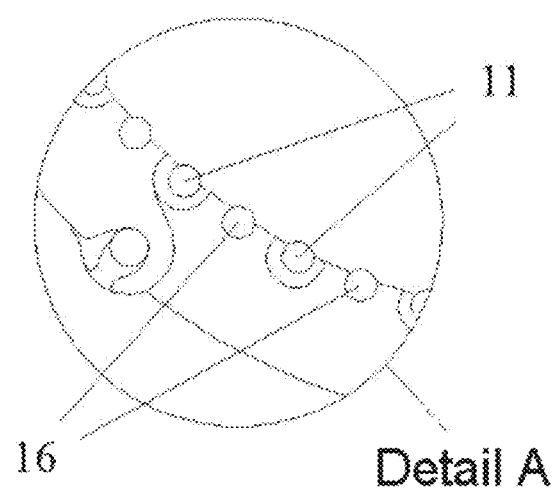
Fig. 9.2

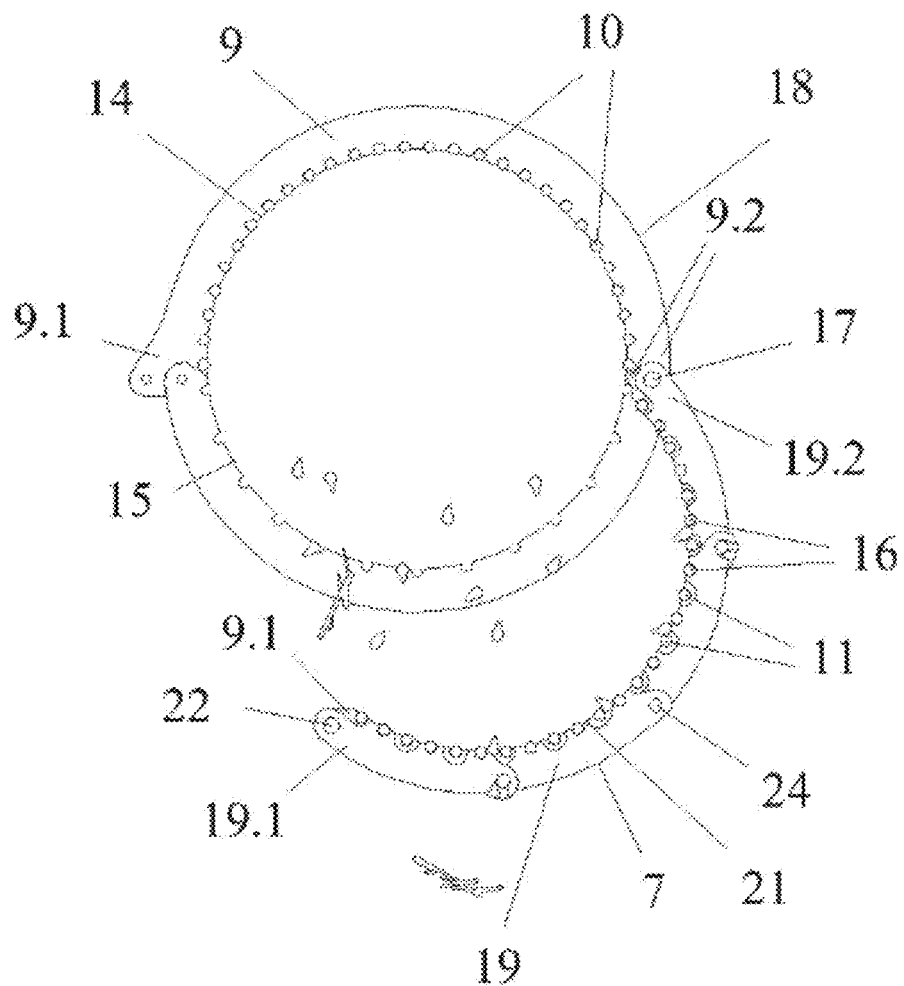
Fig. 9.3

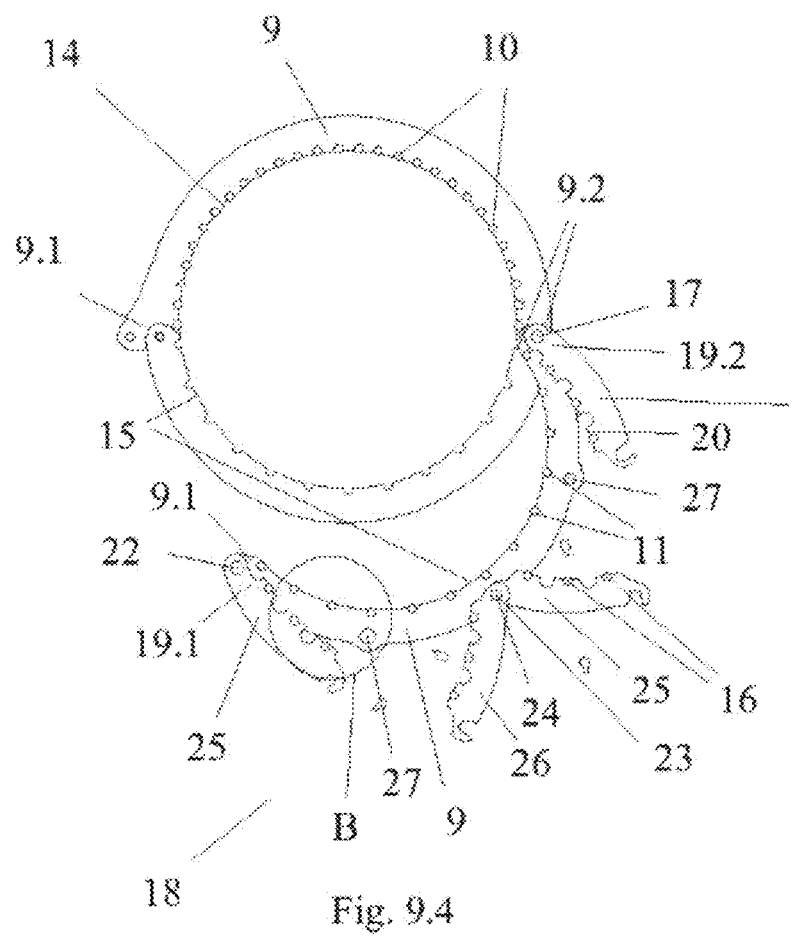
Fig. 9.4
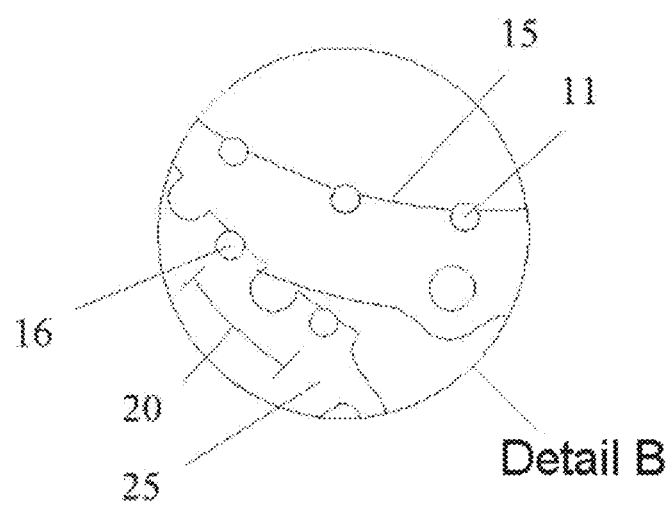
Detail B
Fig. 9.5

MACHINE FOR THE INTEGRAL PROCESSING OF HARD-OR-SOFT-SHELLED NUTS

FIELD OF THE INVENTION

The present invention corresponds to the technical field comprised in the industrial sector for the manufacture and installation of machines for the integral processing of hard- or soft-shelled nuts, specifically those comprising a feeding hopper and at least one receptacle connected there to in a horizontal position according to the longitudinal direction of the machine, and comprising therein a central rotating shaft concentric with the receptacle and arranged according to the longitudinal direction, as well as finger-like elements projecting radically outwards from various longitudinal positions of said shaft.

BACKGROUND OF THE INVENTION

A wide variety of machines for processing hard- or soft-shelled nuts performing the functions of cracking and/or shelling these nuts is available today.

Due to the nature of the raw material with which they work, these machines, when carrying out cracking and/or shelling tasks, must, on one hand, allow the exit of the resulting cracked or shelled nut, and on the other hand, take into consideration the discharge of skins and shells resulting from the process.

This discharge of skins, shells, as well as of any other impurity or foreign matter is necessary because, otherwise, the nut outlet areas would collapse due to the accumulation of these residues, reducing machine efficiency and yield.

The function of discharging shells and foreign matters is associated with certain problems due to blockage which may occur in the outlet area for nuts processed by means of the machine.

In the state of the art, machines which successfully process hard- or soft-shelled nuts by simultaneously separating the nuts from shells and impurities are available in the sector.

Reference documents ES1062979, ES1068167, and ES1077665, belonging to the applicant itself, can be mentioned as an example of the state of the art.

Reference document ES1062979 defines a shelling-separating machine, particularly designed for application thereof with products such as almonds, hazelnuts, or others of similar nature, whereby the operation of shelling and separating the nut and residues for utilizing the former and eliminating the latter is performed.

It is structured around a frame in which a receptacle is supported to receive and treat the product, said receptacle being fixed in the frame according to the longitudinal direction thereof. The receptacle has an opening for introducing the product and an outlet located at the end of the receptacle opposite the mentioned opening for extracting and collecting residues resulting from the operation of shelling and separating the nut, with a shaft extending through the inside of the mentioned receptacle, supported on end bearings secured to the frame, and provided at one of its ends with a pulley through which a rotational movement is communicated to said shaft by means of a motor-operated transmission belt.

The receptacle is made up of a series of rods arranged by way of a coil forming a separation between the threads such that it allows the shelled nut to exit towards a collecting hopper or container located below the machine. In turn, the shells, together with the impurities and hard-shelled almonds which usually come with soft-shelled almonds, are directed towards the outlet opening.

Given that in practice, the soft-shelled almond is usually mixed with a certain percentage of the hard-shelled almond which requires a different treatment; this machine presented problems because it was not capable of properly handling the separation of the amount of hard-shelled almonds that come with soft-shelled almonds.

For solving same, the applicant developed a shelling-separating machine, particularly for almonds and other soft-shelled nuts, presented in reference document ES1068167. With this machine, kernel extraction is carried out in good quality conditions with the separation and controlled ejection of the percentage of hard-shelled almonds which are usually mixed with the soft-shelled almonds.

Said machine comprises a receptacle supported by a frame intended for receiving the almonds to be treated, having an access opening at a first end, an outlet opening at the opposite end, and a lower collecting hopper for collecting the kernel already separated from the shell. It furthermore has a rotary shaft extending longitudinally inside the receptacle and provided with a plurality of finger-like filiform elements distributed along its length and in charge of interacting by friction with the almonds for breaking the shell and extracting the kernel, said shaft being supported by bearings associated with each of the respective ends, and being operated in a rotational manner by means of a pulley and a belt driven from a motor.

This machine presents a substantial improvement with respect to the preceding one because the receptacle for cracking the shell of the almonds to extract the kernel, in addition to incorporating a feeding hopper for feeding the product through one of its ends, includes an outlet at the opposite end closed by means of a gate the opening of which is controlled by means of one or more functional parameters of the machine, thereby maintaining a suitable product level inside the receptacle and achieving greater machine operating efficiency.

This machine entails a substantial improvement with respect to the operability and functionality of the existing machines. Nevertheless, both the first proposed machine and this second machine which entails an improvement over the first machine; still present problems in practice due to frequent blockages that occur when some shell parts or other foreign matters are stuck between two consecutive threads of the coil configuration of the receptacle where the cracking operation is carried out.

In this manner, when blockage occurs between the threads of the coil formed by the rods, the machine must be stopped and partially disassembled to enable accessing the inside thereof and performing manual cleaning tasks, removing those foreign matters or the shells themselves that have gotten stuck. This generates significant time losses, with the subsequent increase in production costs that it entails.

Furthermore, both machines have a space for the passage of the nut which does not allow the variation thereof depending on the type and size of the nut being processed, so each machine is intended for a specific type of nut with which it obtains maximum efficiency and it does not present the option of varying some of its characteristics to enable processing different types of nut for which it is not as effective.

To solve this problem, the applicant itself produced a machine with substantial improvements. Reference document ES1077665 describes this machine which is based fundamentally on the two preceding machines, but unlike them, the receptacle is made up of multiple concentric rings aligned according to the longitudinal direction of the machine. These rings are divided into two groups or halves, of which a first group of rings are fixed in the positioning thereof, and a second group of rings are movable according to an upward/downward movement with respect to the fixed rings.

In this manner, when a stuck of foreign element is present, it is possible to actuate the upward or downward movement of the group of movable rings and thereby help to clear the foreign matter.

Furthermore, the movement of a group of rings with respect to the other one provides the additional advantage of being able to regulate the space of passage existing between the rings, according to specific needs depending on the different sizes of the nut.

Nevertheless, it is observed in practice that this machine still presents blockage problems due to shells or foreign matters that cannot be readily removed with the upward-downward movement of the group of movable rings. Therefore, when a branch gets stuck between the rings, for example, the short length of movement of the rings is not enough to clear same, and the machine must again be stopped and disassembled to enable performing cleaning tasks.

This reduces machine yield and operability and increases costs. Furthermore, the ring shape of the receptacle presents constructive difficulties as the welds are more complicated. All this affects the price of these machines. Furthermore, the ring shape of the rods generates greater difficulty in achieving a specific separating space between the rods.

A machine for processing nuts that can handle foreign matters and shells and that, in the event of blockage by the foreign matters and shells, allows a quick and simple cleaning, has not be been found in the state of the art.

SUMMARY OF THE INVENTION

The machine for the integral processing of hard- or soft-shelled nuts herein proposed comprises a feeding hopper and at least one receptacle having a first end for connection to said hopper and a second opposite end, where said receptacle is located in a horizontal position according to the longitudinal direction of the machine and comprises therein a central shaft located according to the longitudinal direction thereof and connected at one end to rotating element, where said central shaft has finger-like elements projecting radially outwards from various longitudinal positions thereof.

In this machine for integral processing, the at least one receptacle is configured by means of a fixed upper portion and a lower portion connected thereto.

Both the upper portion and the lower portions comprise a first side and a second side having a semicircular shape that are arranged opposite and parallel to one another and perpendicular to the central shaft, such that they allow the passage of the central shaft. These sides with semicircular shape have a first end and a second end.

Said upper portion and lower portion likewise comprise a plurality of first rods with respective opposite ends secured to the sides of the upper portion and a plurality of second rods with respective opposite ends secured to the sides of the lower portion. Both the first rods and the second rods are arranged adjacent to and successively separated from one another by a separating space, respectively, and they are all located according to the longitudinal direction of the central shaft.

Moreover, the lower portion of the receptacle comprises first connecting element for connecting the first end and second end of the sides thereof to the first end and second end of the respective sides of the upper portion, where said first connecting element are movable at least at the first end of both sides, such that they allow opening or closing the receptacle through the lower portion thereof.

With the machine for the integral processing of hard- or soft-shelled nuts herein proposed, a significant improvement over the state of the art is obtained.

This is because, since the receptacle of this machine is divided into two portions connected by connecting element(s) movable on at least one end of the sides, it has the possibility of opening the lower portion with respect to the fixed upper portion at the other end, and thereby greatly facilitating cleaning tasks should that be necessary.

Furthermore, in the case of connecting element(s) movable at one end of the sides, the separation of the lower portion can be by the pivoting movement which allows opening the receptacle, or in the case of connecting element(s) movable at both ends of the sides, by a complete detachment of the lower portion with respect to the upper portion. In both cases, a quick and simple removal of the elements that are stuck is achieved.

A highly efficient machine is therefore achieved, whereby cleaning and clearance of stuck elements can be performed in a quick and simple manner, without having to disassemble the machine, but rather with simply opening the lower portion either by the option of pivoting the lower portion or by completely removing same. In this manner, when cleaning must be performed due to the existence of stuck elements, the lower portion is opened, then cleaning is performed eliminating said elements, and then the lower portion is closed again to resume the process.

Moreover, this machine has an additional advantage in the case in which the connecting element(s) are movable at both ends of the sides, since the lower portion can be detached completely, it allows the removal of a lower portion having a specific separating space between rods and replacing same with another lower portion that is the same as the previous one but having a different separating space.

In this manner, it is possible to act with the most suitable separating space at all times, achieving greater machine efficiency.

Likewise, it is possible for the machine to have more than one receptacle arranged consecutively, and in this case said receptacles can have one and the same or different separating space between the rods of the lower portion, depending on the type of nut and on the behavior observed therein.

This machine is furthermore easier to manufacture since the straight rods greatly facilitate both the welding task and the task for obtaining the desired separating space, which is much more complicated when working with rods arranged by way of a coil or circular rods.

This machine is therefore easier to manufacture and use, allows improving the operation thereof as a result of the possibility of performing cleaning tasks in a quick and simple manner, and at the same time enables exchanging the lower portion with another one having a different separating space between the rods, which allows acting with greater efficiency on nuts of different types and weights.

This leads to an increased machine yield and production, as well as reduced machine manufacturing and operation costs.

BRIEF DESCRIPTION OF THE DRAWINGS

For the purpose of helping to better understand the features of the invention according to a preferred practical embodiment thereof, a series of drawings is provided as an integral part of said description in which the following is depicted with an illustrative and non-limiting character:

FIGS. 4.1, 4.2, and 4.3 show plan, elevational and profile views of a receptacle of the machine for the integral processing of hard- or soft-shelled nuts in the open position in accordance to a first preferred embodiment of the invention.

FIGS. 9.1, 9.2, 9.3, 9.4, and 9.5 show section views in the closed position, a view of a detail A, the section views of the two opening options, and the views of a detail B, of a receptacle of the machine for the integral processing of hard- or soft-shelled nuts, for a third preferred embodiment of the invention.

DETAILED DESCRIPTION OF THE INVENTION

Figure 1:
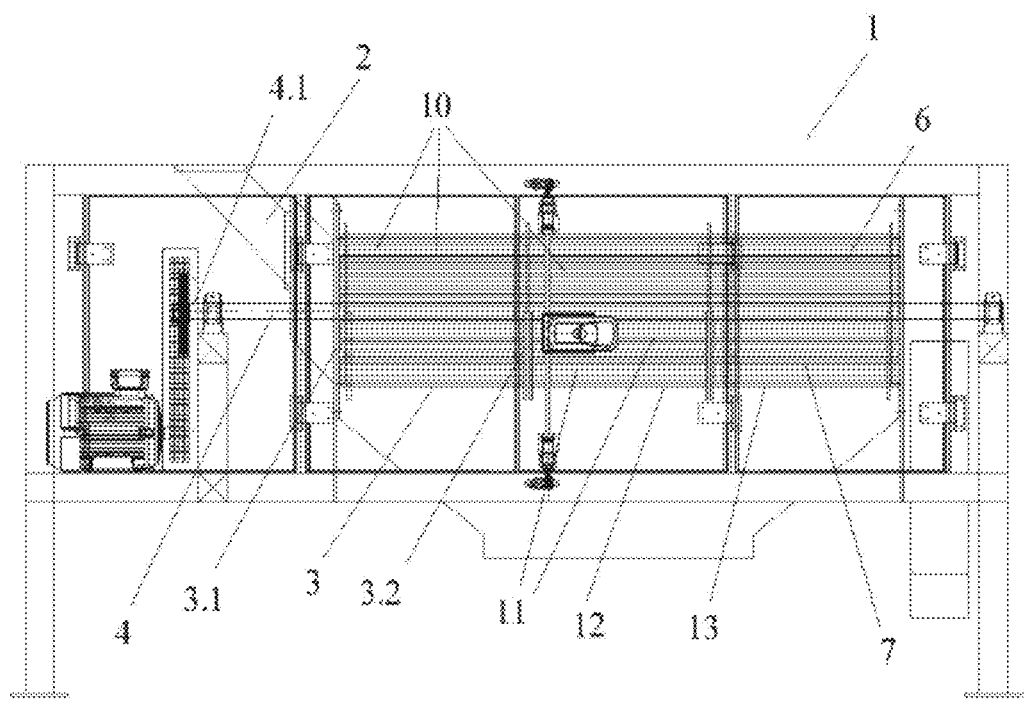
FIG. 1 shows an elevational view of the machine for the integral processing of hard- or soft-shelled nuts with the receptacle in the closed position, for a first preferred embodiment of the invention.

In view of the provided drawings, it can be observed how in a first preferred embodiment of the invention, the machine (1) for the integral processing of hard- or soft-shelled nuts herein proposed comprises a feeding hopper (2) and at least a first receptacle (3) having a first end (3.1) for connection to said hopper (2) and a second opposite end (3.2). Said receptacle (3) is located in an horizontal position according to the longitudinal direction of the machine (1) and comprises therein a central shaft (4) arranged according to the longitudinal direction thereof and connected at one end (4.1) to rotating element(s) having finger-like elements (5) radially projecting outwards from various longitudinal positions of said shaft (4).

As shown in FIGS. 4.1 to 4.3 and 5, the at least a first receptacle (3) is configured by a fixed upper portion (6) and a lower portion (7) connected thereto.

Both the upper portion and the lower portion (6, 7) comprise a first side and a second side (8, 9) having a semicircular shape that are arranged opposite and parallel to one another and perpendicular to the central shaft (4) with a first end and a second end (8.1, 9.1, 8.2, 9.2), such that they allow the passage of the central shaft (4).

The at least a first receptacle (3) is furthermore configured by a plurality of first rods (10) having two opposite ends (10.1, 10.2) respectively secured to one of the sides (8, 9) of the upper portion (6) and by a plurality of second rods (11) with respective opposite ends (11.1, 11.2) secured to the sides (8, 9) of the lower portion (7), All of them are arranged adjacent to and successively separated from one another by a first and a second separating spaces (14, 15), respectively. Likewise, all these first and second rods (10, 11) are located according to the longitudinal direction of the central shaft (4).

As can be observed in FIGS. 4.1 to 4.3 and 5, the lower portion (7) of the at least a first receptacle (3) comprises first connecting element(s) for connecting the first end and second end (8.1, 9.1, 8.2, 9.2) of the sides (8, 9) thereof to the first end and second end (8.1, 9.1, 8.2, 9.2) of the respective sides (8, 9) of the upper portion (6). These first connecting element(s) are movable at least at the first end (8.1, 9.1) of both sides (8, 9), such that they allow opening or closing the at least a first receptacle (3) through the lower portion (7) thereof.

In this first preferred embodiment of the invention, the first connecting element(s) at the second end (8.1, 9.2) of both sides (8, 9) of the upper portion and lower portion (6, 7) are formed by a first swinging shaft (17), such that it allows an opening movement of the lower portion (7) with respect to the upper portion (6) of the receptacle (3) by means of the rotation thereof about said shaft.

Moreover, in this first preferred embodiment of the invention as shown in FIG. 1, the machine (1) comprises at least a second receptacle (12) located in an horizontal position according to the longitudinal direction of the machine (1), after the first receptacle (3) and connected thereto. Specifically, in this case the machine (1) comprises three receptacles (3, 12, 13).

Figure 2:
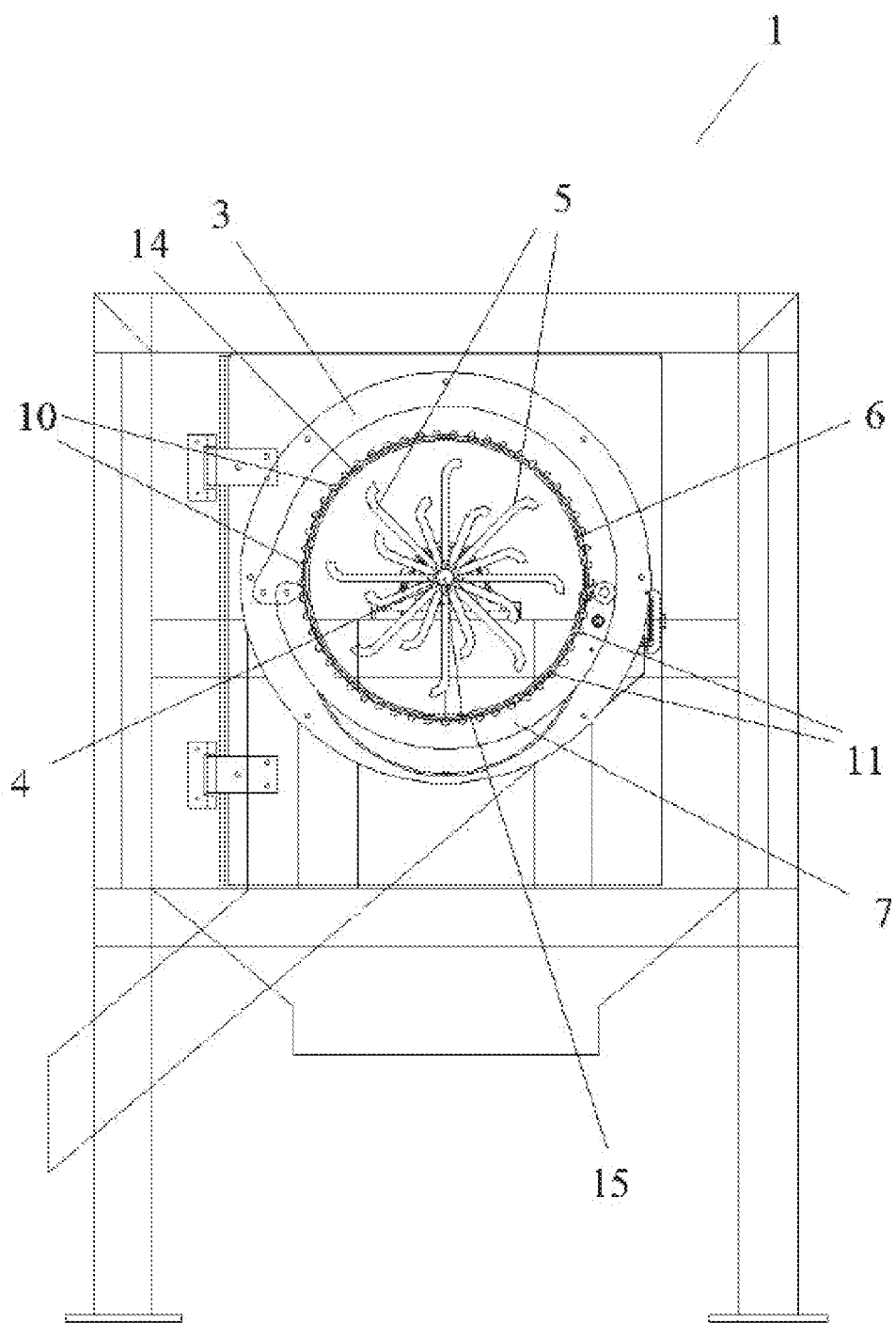
FIG. 2 shows a view of the cross-section of the machine for the integral processing of hard- or soft-shelled nuts with the receptacle in the closed position, for a first preferred embodiment of the invention.
Figure 3:
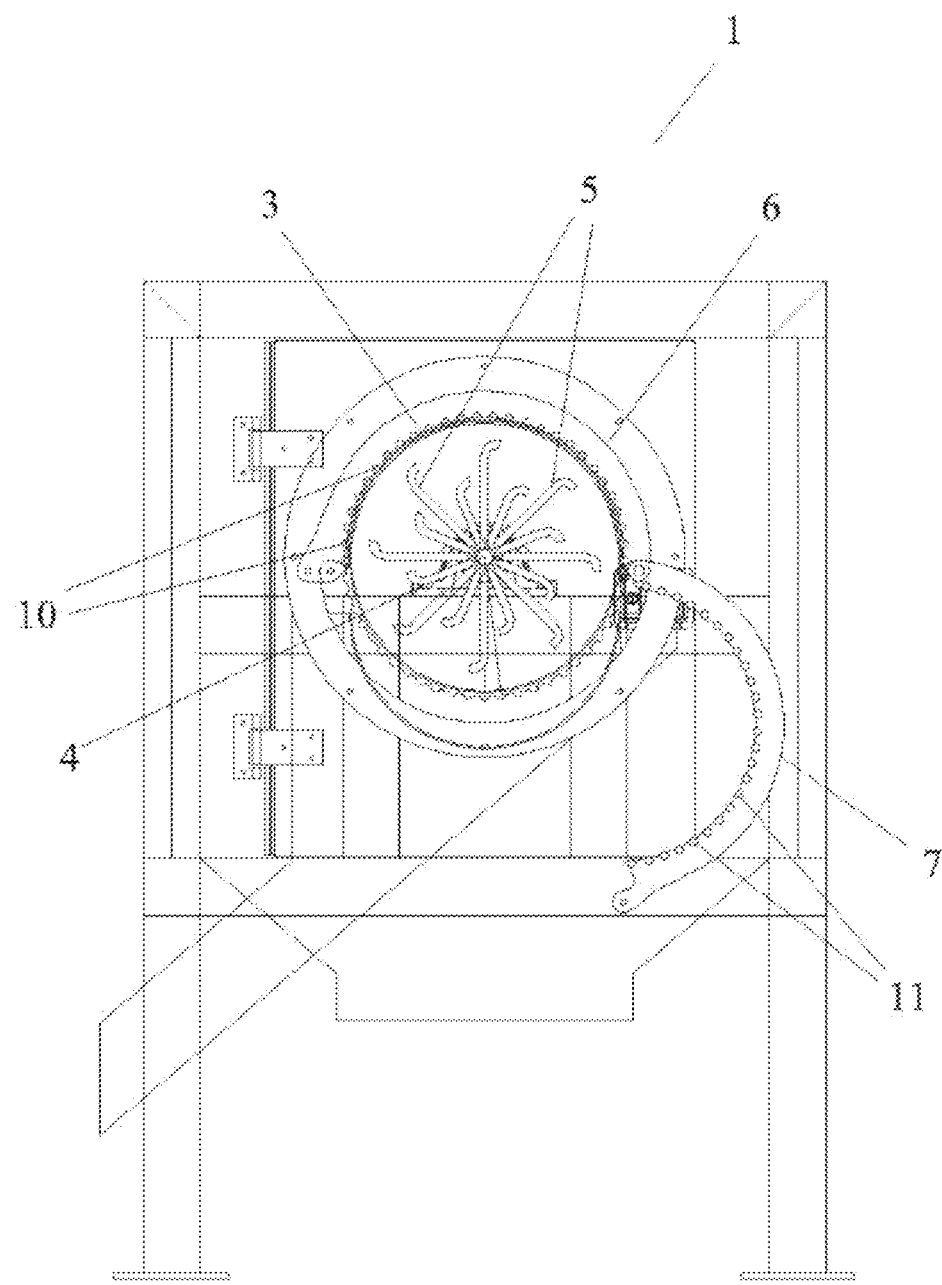
FIG. 3 shows a profile view of the machine for the integral processing of hard- or soft-shelled nuts with the receptacle in the open position, for a first preferred embodiment of the invention.

Therefore, as can be observed in FIGS. 1 and 2 the lower portion of the three receptacles (3, 12, 13) of this machine (1) has a first working position in which the lower portion (7) of the receptacles (3, 12, 13) is closed, and as shown in FIGS. 3, 4.1 to 4.3, and 5, a second open position, i.e., a cleaning position, in which the lower portion (7) is open with respect to the upper portion (6), in a rotational movement about the first swinging shaft (17) which allows accessing the inside of the receptacles (3, 12, 13) in an easy and comfortable manner, without having to disassemble any part of the machine. Furthermore, the cleaning of that receptacle in which stuck foreign elements are present can be performed independently from the other receptacles in which there may not be any element that requires cleaning.

This reduces the times invested in cleaning tasks and the man power intended for same.

It can be observed in FIGS. 4.2 and 5 that in this first preferred embodiment of the invention, the second rods (11) of the lower portion (7) of the three receptacles (3, 12, 13) have a second separating space (15) between same that is the same as the first separating space (14) existing between the first rods (10) of the upper portion (6). In other embodiments, it is possible that at least one of the three receptacles does not have the same second separating space (15) as that existing between the first rods (10) of the upper portion (6) or that at least one of the receptacles does not have the same second separating space (15) as the rest, with this separating space being the same as or different from that of the upper portion (6).

Moreover, in this first preferred embodiment of the invention the second end (13.2) of the receptacle (13) which is arranged farther away from the connection to the hopper (2)

comprises an outlet opening with closure element(s) formed by a gate and control element(s) for controlling same.

This specification proposes a second preferred embodiment of the invention that is similar to the preceding embodiment, in which the first connecting element(s) at the second end (8.2, 9.2) of both sides (8, 9) of the upper portion and lower portion (6, 7), in addition to being formed by a first swinging shaft (17), are movable. In other words, said first swinging shaft (17) allows detaching the portions making up same, thereby allowing the complete separation of the lower portion (7) with respect to the upper portion (6) of the receptacle (3, 12, 13).

In other embodiments, it is possible that these connecting element(s) are movable and not formed by a first swinging shaft (17), in which case the receptacle does not have the possibility of rotating the lower portion with respect to said first swinging shaft (17), and the lower portion (7) must be completely separated from the upper portion (6) in order to open same.

Figure 6:
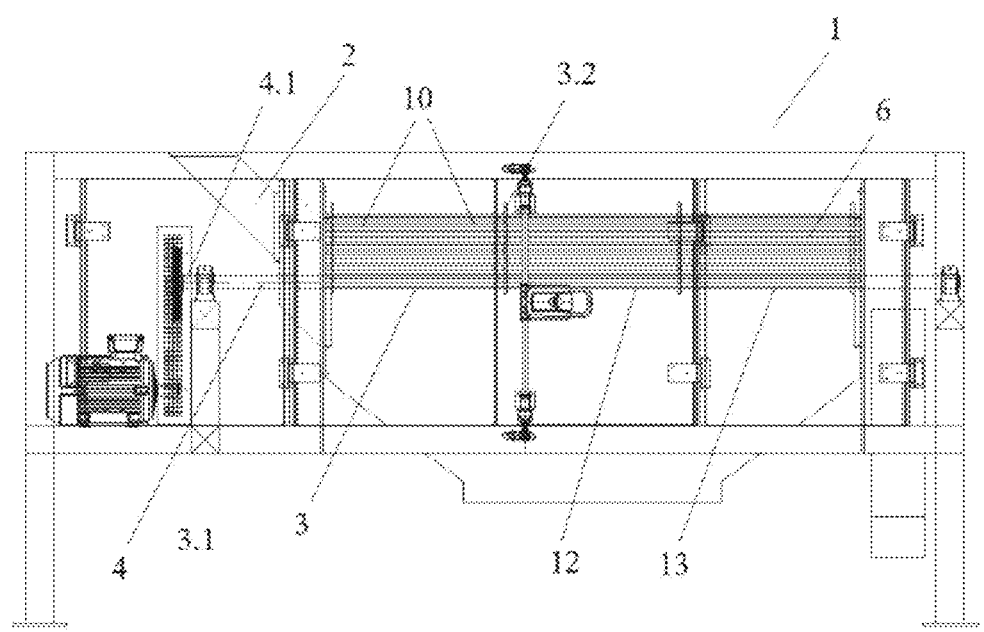
FIG. 6 shows an elevational view of the machine for the integral processing of hard- or soft-shelled nuts with the receptacle in the open position, for a second preferred embodiment of the invention.
Figure 7:
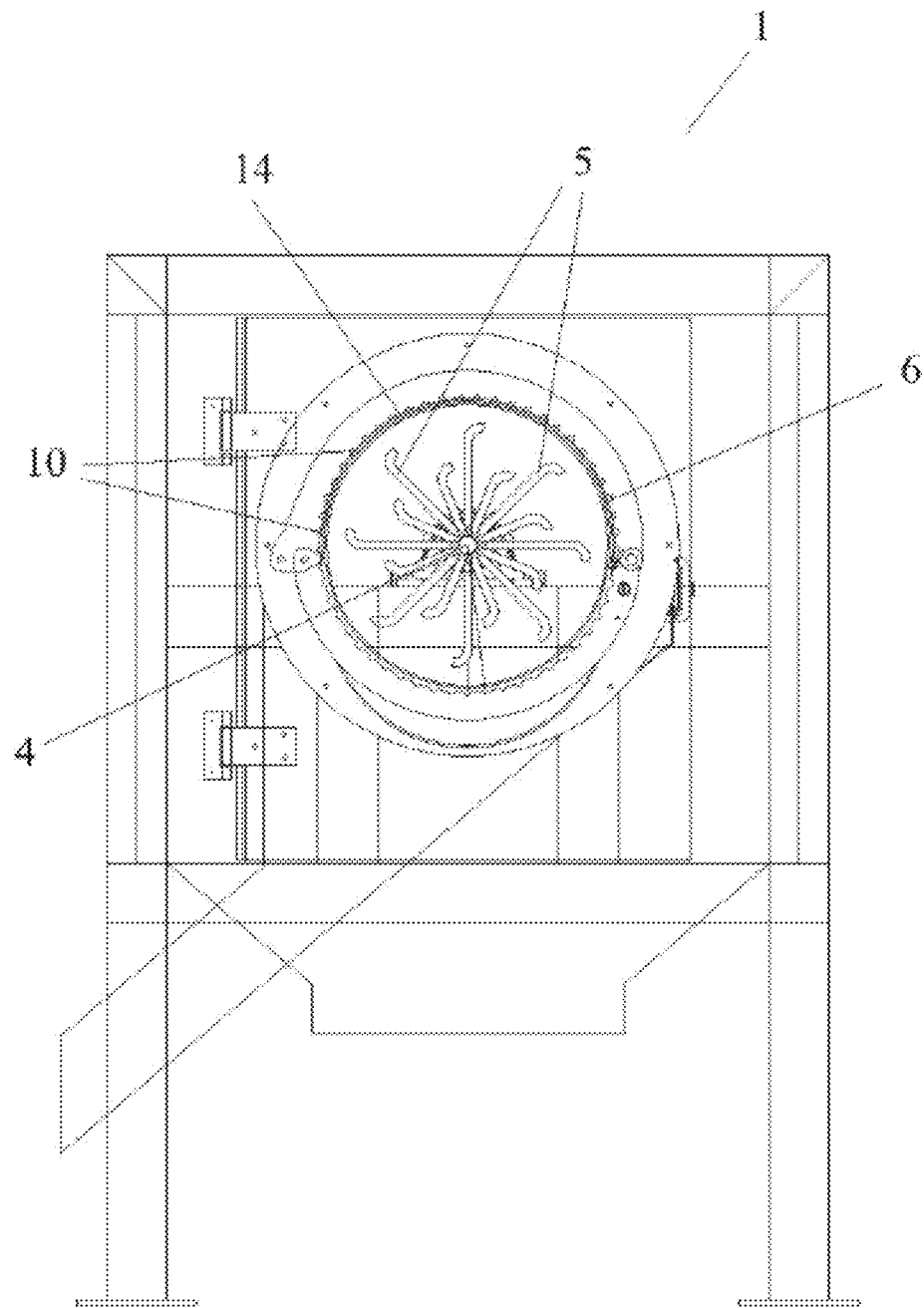
FIG. 7 shows a profile view of the machine for the integral processing of hard- or soft-shelled nuts with the receptacle in the open position, for a second preferred embodiment of the invention.
Figure 8:
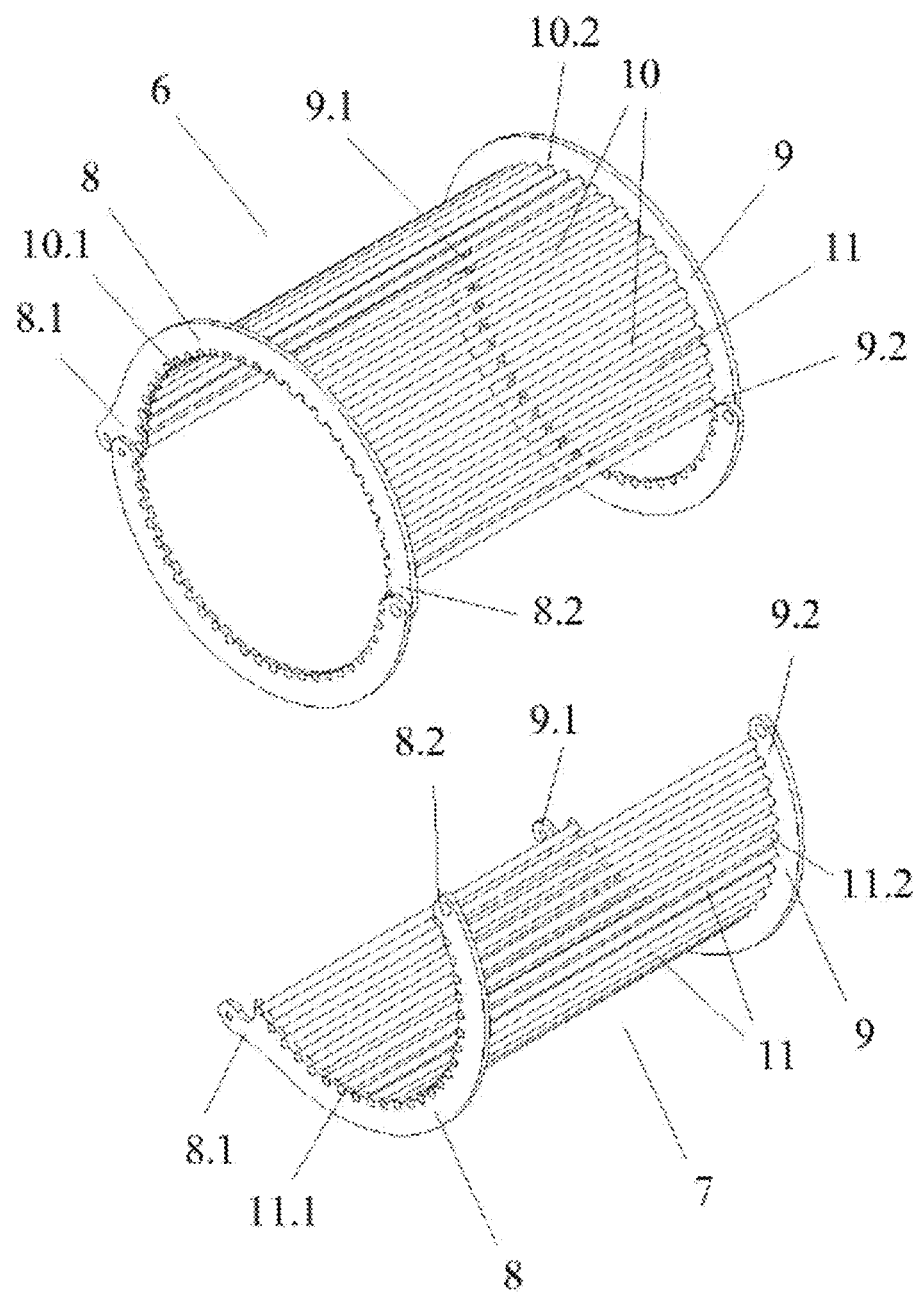
FIG. 8 shows a perspective view of a receptacle of the machine for the integral processing of hard- or soft-shelled nuts in the open position, for a second preferred embodiment of the invention.

Therefore, in this second preferred embodiment of the invention, as a result of the first connecting element(s) of both ends (8.1, 9.1, 8.2, 9.2) being movable, in addition to opening the lower portion (7) of the receptacle (3, 12, 13) with respect to its upper portion (6) by means of a rotation about the first swinging shaft (17), the lower portion can be removed completely, as shown in FIGS. 6, 7, and 8.

Figure 5:
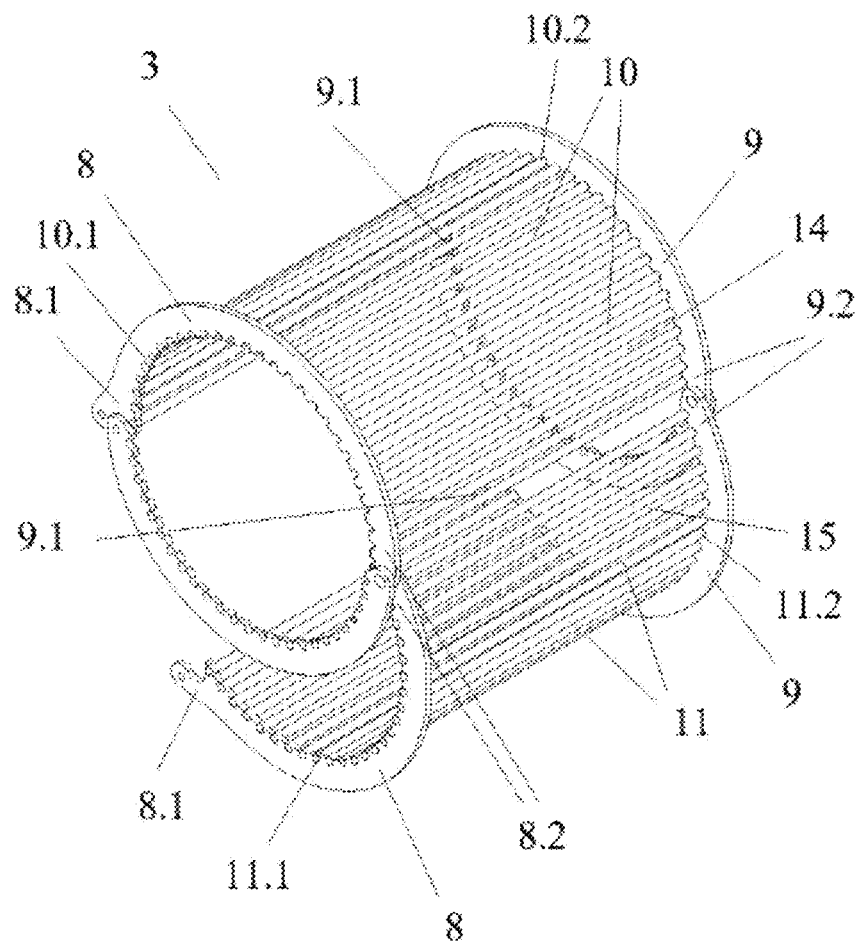
FIG. 5 shows a perspective view of a receptacle of the machine for the integral processing of hard- or soft-shelled nuts with the receptacle in the open position, for a first preferred embodiment of the invention.

Therefore, when one of the receptacles (3, 12, 13) has to be cleaned due to a foreign element getting stuck between the second rods (11) forming same, the lower portion (7) is opened by means of a rotation thereof, as shown in FIGS. 3 and 5.

Moreover, as a result of the possibility of removing the lower portion (7) completely, this machine (1) offers the option of exchanging the lower portion (7) of any of the receptacles (3, 12, 13), having a specific second separating space (15) between its second rods (11), with another lower portion (7) with a different second separating space (15) that is more suitable for the specific type and size of the nut to be processed.

In this second preferred embodiment of the invention, the second rods (11) of the lower portion (7) of the three receptacles (3, 12, 13) which the machine (1) contains have a second separating space (15) between same that is the same as the first separating space (14) existing between the first rods (10) of the upper portion (6), and it is possible to exchange the lower portion (7) of one of the receptacles or of all the receptacles with other lower portions (7) with a second separating space (15) different from the separating space they have.

This specification describes a third preferred embodiment of the invention in which the first connecting element(s) at the second end (8.2, 9.2) of both sides (8, 9) of the upper portion and lower portion (6, 7) are formed by a first swinging shaft (17) which is not considered movable in this case, but can indeed be considered as such in other cases.

As shown in FIGS. 9.1, 9.3, and 9.4, the at least a first receptacle (3) in this third embodiment comprises a complementary part (18) having a first side and a second side (19) with a semicircular shape arranged adjacent to the inner face of the first side and second side (8, 9) of the lower portion (7) thereof.

This complementary part (18) further comprises a plurality of third rods (16) with a first end and a second end (16.2) secured to said first side and second side (19) of the complementary part (18), respectively. These third rods (16) are located according to the longitudinal direction of the central shaft (4) and are successively separated from one another by a third separating space (20) between same.

This complementary part (18) is located coupled to the lower portion (7) of the receptacle, such that the third rods (16) are positioned alternately with respect to the second rods (11), as can be observed in FIG. 9.2, and have, with the second rods, a fourth separating space (21) of a smaller dimension than the third separating space (20), shown in FIG. 9.5.

As can be observed in FIGS. 9.1, 9.3, and 9.4, in this third embodiment the first separating space (14) between the first rods (10) of the upper portion (6) is smaller than the second separating space (15) existing between the second rods (11) of the lower portion (7). The third rods (16) which are located alternately reduce the space for the passage of the nut, which instead of being the second separating space (15) is the third separating space (20), which is smaller than the second separating space.

Likewise, the complementary part (18) comprises second connecting element(s) for connecting the first end and second end (19.1, 19.2) of the sides thereof to the first end and second end (9.1, 9.2) of the respective sides of the lower portion (7).

In this third preferred embodiment of the invention, the second connecting element(s) are formed by a second swinging shaft (22) at the first end (19.1) of the sides (19) of the complementary part (18), and by the first swinging shaft (17) of the first connecting element(s) at the second end (19.2) of said sides (19). As shown in FIGS. 9.1, 9.3, and 9.4, both first side and second side (19) of said complementary part (18) are formed by two halves attached at a third end (24) of the two halves by first attachment element(s). The drawings only show the second side of the complementary part as they are profile views.

Furthermore, in this third embodiment, the first attachment element(s) of the third end (24) of the two halves are formed by a third swinging shaft (23) fixed to the corresponding side of the lower portion (7), where each of said halves is formed by respective segments (25, 26) having a fourth end (27) for attachment thereof by means of second movable attachment element(s).

Therefore, if in a first nut processing position, as shown in FIG. 9.1, there are foreign matters or elements of a considerable size, such as small branches, stuck between the second rods (11) of the lower portion (7), there is the possibility of opening said lower portion (7) as shown in FIG. 9.3, similar to what has been described in the first proposed embodiment.

However, in addition to the possibility of small branches getting stuck, in practice nuts with a size similar to the second separating space (15) between the second rods (11) may also become lodged between same and may not be able to leave. In this case, the problem is not solved by opening the lower portion (7) with respect to the upper portion because these nuts may get stuck between the second rods (11) so much that it is complicated to release them.

With this third embodiment, it is possible to open the complementary part (18) by means of rotating the segments (25, 26) of each of the halves forming the sides thereof. Each segment (25, 26) rotates with respect to the first, second, or third swinging shafts (17, 22, 23), such that the complementary part (18) is decoupled with respect to the lower portion (7) of the receptacle, and the third rods (16) which were arranged alternately with the second rods (11) thereby shift from said alternating arrangement, transforming the third separating space (20) existing for the passage of the nut into a second separating space (15) with a greater dimension, which allows discharging any element stuck between the rods.

In other embodiments, the second connecting element(s) can be movable at the first end and second end (19.1, 19.2) of the sides (19) of the complementary part (18), so the complementary part can be decoupled from the lower portion (7) by moving it completely with a rotational movement similar to that of the lower portion (7) itself in the second proposed embodiment. In this case, the sides (19) of the complementary part (18) are not divided into halves, nor were these halves divided into segments.

Moreover, in other embodiments the second connecting element(s) can be movable at the first end (19.1) of the sides (19) of the complementary part (18), whereas they are formed by the first swinging shaft (17) at the second end (19.2). In this manner, the complementary part (18) would be capable of rotating with respect to said first swinging shaft (17) and this movement again decouples same with respect to the lower portion (7) of the receptacle. In this case, the sides of the complementary part are not divided into halves, nor were these halves divided into segments.

Likewise, in other embodiments the sides (19) of the complementary part (18) are formed by two halves and the first attachment element(s) of the third end (24) of the two halves are movable. In this case, when the complementary part (18) must be decoupled with respect to the lower portion (7), said attachment element(s) of the third end (24) are removed, such that both halves would have a rotational movement with respect to the first swinging shaft and the second swinging shaft (17, 22), and the decoupling of both portions would again be achieved.

The described embodiments only constitute examples of the present invention, therefore the specific details, terms, and phrases used in the present specification must not be considered limiting, but rather be understood as a basis for the claims and a representative basis providing a comprehensible description as well as information sufficient for one skilled in the art to apply the present invention.

What is claimed is:

1. A machine for the integral processing of hard- or soft-shelled nuts, comprising:
    a feeding hopper and a first receptacle having a first end for connection to said hopper and a second opposite end, where said receptacle is located in a horizontal position and extends in a longitudinal direction of the machine and comprises therein a central shaft having finger-like elements projecting radially outwards from various longitudinal positions of said central shaft, the central shaft extending in the longitudinal direction and configured to rotate;
    the first receptacle is configured with a fixed upper portion and a lower portion connected thereto, where both the upper and lower portions comprise a first side and a second side, each side of the upper and lower portions comprising a first end at one side of the central shaft and a second end at an opposite side of the central shaft, and each side of the upper and lower portions having a semicircular shape and being arranged opposite and parallel to one another and perpendicular to the central shaft with the first end of the first receptacle and the second end of the first receptacle wherein the central shaft passes through the first side and second side;
    a plurality of first rods with respective opposite ends secured to the first and second sides of the upper portion and a plurality of second rods with respective opposite ends secured to the sides of the lower portion, where each of said first rods and second rods are arranged adjacent to and successively separated from one another with the first rods each separated by a first separating space and the second rods separated by a second separating space, all of the plurality first and second rods extending in the longitudinal direction of the central shaft;
    the lower portion comprises a first connector which connects the first end and second end of the lower portion first and second sides to the first end and second end of the respective first and second sides of the upper portion;
    said first connector is movable at least at the first end of both first and second sides to allow opening or closing the first receptacle through the lower portion thereof.

2. The machine for the integral processing of hard- or soft-shelled nuts according to claim 1 further wherein the first connector at the second end of both sides of the upper portion and lower portion is formed by a first swinging shaft.

3. The machine for the integral processing of hard- or soft-shelled nuts according to claim 1 wherein the second separating space existing between the second rods of the lower portion of the at least a first receptacle is the same as the first separating space existing between the first rods of the upper portion.

4. The machine for the integral processing of hard- or soft-shelled nuts according to claim 1 wherein the second separating space existing between the second rods of the lower portion of the at least a first receptacle is different from the first separating space between the first rods of the upper portion.

5. The machine for the integral processing of hard- or soft-shelled nuts according to claim 1 wherein the at least a first receptacle comprises a complementary part having a first side and a second side with a semicircular shape arranged adjacent to an inner face of the first side and second side of the lower portion of the complementary part and a plurality of third rods with a first end and a second end secured to said first side and second side of the complementary part, respectively, where the third rods extend in the longitudinal direction of the central shaft and successively separated from one another by a third separating space between adjacent third rods, and where said complementary part is located coupled to the lower portion of the receptacle, such that the third rods are positioned alternately with respect to the second rods and have, with the second rods, a fourth separating space of a smaller dimension than the third separating space, and where the complementary part comprises a second connector which connects the first end and second end of the sides thereof to the first end and second end of the respective sides of the lower portion.

6. The machine for the integral processing of hard- or soft-shelled nuts according to claim 5 wherein the second connector is movable at least at the first end of the sides of the complementary part.

7. The machine for the integral processing of hard- or soft-shelled nuts according to claim 5 wherein the second connector is formed at least in part by a second swinging shaft at the first end of the sides of the complementary part, wherein the first side and the second side of said complementary part are formed by two halves attached at an end of the two halves with a first attachment element.

8. The machine for the integral processing of hard- or soft-shelled nuts according to claim 7 wherein the first attachment element is movable.

9. The machine for the integral processing of hard- or soft-shelled nuts according to claim 7 wherein the first attachment element is formed by a third swinging shaft fixed to the corresponding side of the lower portion, where each of said halves is formed by respective segments having a fourth end for attachment thereof by a second movable attachment element.

10. The machine for the integral processing of hard- or soft-shelled nuts according to claim 1 wherein the first connector is at the second end of the upper portion and lower portion and is movable.

11. The machine for the integral processing of hard- or soft-shelled nuts according to claim 1 further comprising at least a second receptacle located in a horizontal position according to the longitudinal direction of the machine, after the first receptacle and connected thereto.

12. The machine for the integral processing of hard- or soft-shelled nuts according to claim 11, wherein the second separating space of the second rods of the lower portion of at least one of the receptacles is different from that of the rest of the receptacles.

13. The machine for the integral processing of hard- or soft-shelled nuts according to claim 1 wherein the second end of the receptacle is arranged farther away from the connection to the hopper and comprises an outlet opening with a closure element formed by a gate and a control element for controlling the gate.

\* \* \* \* \*